United States Patent
Wood (10) Patent No.: US 7,306,443 B2
(45) Date of Patent: Dec. 11, 2007

(54) ROTATIONAL MOULDING MACHINE

(75) Inventor: Richard Roy Wood, Randburg (ZA)

(73) Assignee: Almar Packaging Solutions (Pty) Limited, Umhlanga (ZA)

( * ) Notice: Subject to any disclaimer, the term of this patent is extended or adjusted under 35 U.S.C. 154(b) by 337 days.

(21) Appl. No.: 10/541,023

(22) PCT Filed: Jan. 23, 2004

(86) PCT No.: PCT/ZA2004/000008

§ 371 (c)(1),
(2), (4) Date: Jun. 28, 2005

(87) PCT Pub. No.: WO2004/065093

PCT Pub. Date: Aug. 5, 2004

(65) Prior Publication Data

US 2006/0165837 A1    Jul. 27, 2006

(30) Foreign Application Priority Data

Jan. 24, 2003    (ZA) ................................ 2002/9973

(51) Int. Cl.
*B29C 33/02*    (2006.01)
*B29C 41/06*    (2006.01)
(52) U.S. Cl. ........................ 425/88; 425/182; 425/384; 425/402; 425/435
(58) Field of Classification Search ................... 425/88, 425/182, 429–435, 384, 402, 377–378.1
See application file for complete search history.

(56) References Cited

U.S. PATENT DOCUMENTS

| 3,677,670 | A | | 7/1972 | Mori et al. |
| 3,914,104 | A | * | 10/1975 | Dean et al. .................. 425/397 |
| 4,050,875 | A | | 9/1977 | Katzman et al. |
| 4,292,015 | A | | 9/1981 | Hritz |
| 4,583,932 | A | * | 4/1986 | Meuret ........................ 425/182 |
| 4,690,626 | A | | 9/1987 | Krzepinski |
| 5,358,682 | A | | 10/1994 | Rogerson |
| 5,620,715 | A | * | 4/1997 | Hart et al. .................. 425/384 |

FOREIGN PATENT DOCUMENTS

| BE | 729 003 | 8/1969 |
| WO | WO 96/38281 | 12/1996 |

* cited by examiner

Primary Examiner—Tim Heitbrink
Assistant Examiner—Thu Khanh T. Nguyen
(74) Attorney, Agent, or Firm—Young & Thompson (57) ABSTRACT

A rotational moulding machine includes three mould manipulator arrangements and a rotatable carrousel on which the manipulators are mounted for indexed rotation between heating, cooling and mould loading stations. Each manipulator includes a rectangular frame, stub axles on the frame which are rotatable in supports on the carousel on a first axis, mould locating element in the frame which is rotatable on a second axis normal to the first and devices for manipulating a mould in the frame on both axes. The machine includes a crane beam over the carrousel which overlies the heating and cooling station positions on the carrousel, a heating chamber, a wall enclosure, and a crane for lowering the heating chamber and wall enclosure over manipulators on the carrousel at the heating and cooling stations and for lifting them clear of the manipulators to enable them to be indexed to the next station.

23 Claims, 4 Drawing Sheets

ROTATIONAL MOULDING MACHINE

FIELD OF THE INVENTION

This invention relates to a machine for the rotational moulding of plastic articles.

BACKGROUND TO THE INVENTION

Conventional multi-arm rotational moulding machines usually include a central rotary hub which is floor mounted and carries several spaced radially projecting cantilever arms which are rotatably located in large bearings in the hub. The free end of each arm carries a structure on which moulds are releasably mounted for manipulation on two axes. The hub, in use, rotates the arms and their mould manipulation structures sequentially through heating, cooling and stripping stations which are located on a circle about the hub axis. The hub is generally a very complex, robust and expensive item of machinery as it contains all of the motors, electric controls, couplings and mechanicals necessary to:
a) rotate each tubular arm in both directions.
b) rotate a coaxial drive shaft within each tubular arm in both directions. The coaxial drive shaft generally carries, at the manipulator, a relatively small diameter bevelled gear which drives a second bevelled gear to rotate the mould carrying structure about its second axis. Because of the small sizes of the gears and so the short torque arm relative to the size of the moulds being manipulated the gears are subjected to enormous torque loads, particularly in the case where the structure is supporting an unbalanced mould, with the result that enormous loads are also placed on the bearings supporting the bevelled gears. The overhung cantilever design of the radial arms additionally results in high cyclic stress reversals due to the nature of the bi-axial rotational movement of the mould mounting structure which may, and not infrequently does, subject the machine mechanisms to premature metal fatigue failure. The gears and their support bearings are additionally operated in extremely hostile environments which are caused by the cyclic heating and cooling of each manipulator as it is rotated through the static heating and cooling stations of the machine further to increase the high wear rates of the already severely loaded components of the mould carrying structure.
c) be sufficiently robust to withstand the lifting forces applied to the arm when stripping a complex mould vertically from the mould carrying structure.
d) provide services through slip-rings and rotary glands.

A further problem with the machines of the prior art is the inefficient use of heat. The heating station ovens generally have two doors, which open to allow an arm carrying a mould manipulating structure to be rotated through the heating station. Alternatively the ovens in some cases are provided with sliding doors which face the machine hub and which when opened allow the entire oven housing to be retracted in a radial direction away from the arm moulds. Either way a large amount of heat in the oven is lost to atmosphere when the doors are opened. Additionally, the oven housings, due to their box-type shape have an internal volume far in excess of what is required with this drastically reducing the thermal efficiency of the oven. This loss of heat requires, during the subsequent heating cycle of the machine, that the heating chamber needs almost totally to be reheated to moulding temperature prior to the effective commencement of the moulding cycle in the oven housing.

As the heating cycle of any rotational moulding machine determines the cycle time of the machine, this warm-up heating period during each heating cycle, expensively increases heating costs and the productive machine cycle time.

In addition to the above multi-arm moulding machines are shuttle-type machines such as those disclosed in the specifications of WO96/38281 and U.S. Pat. No. 4,690,626 in which the mould manipulators are moved in and out of a moulding oven through doors with a large degree of heat loss as occurs with the multi-arm machines.

The specification of U.S. Pat. No. 4,292,015 disclosures four moulding ovens which each include a rock and roll type manipulator and a gas burner. The machines are mounted on a horizontally rotatable platform. To cool the moulds, they are sequently removed from the ovens and are then quenched in a liquid bath which is remote from the ovens. The four dedicated gas burner make this moulding apparatus heat extravagent.

Yet another problem with the above machines of the prior art is that the machines generally require a large amount of floor space with this being aggravated by machines of the type which employ the radially moving heating oven housings.

SUMMARY OF THE INVENTION

A rotational moulding machine according to the invention may include: a mould manipulator arrangement, including a base member, two spaced supports which are fixed to and project upwardly from the base member, a frame arrangement including a rectangular frame element which carries two stub axles which are each attached centrally to and project outwardly from two opposite sides of the frame element to be supported by and journaled for rotation, on a common first axis, in the supports, means for supporting a mould in the frame element, including outwardly projecting shaft portions which are journaled for rotation in the remaining opposite sides of the frame element on a second common axis, means for releasably locating at least one mould in the frame element and means for manipulating the frame arrangement by simultaneously rotating it on the two axes which are normal to each other about a central point in the frame arrangement.

The frame arrangement manipulator may include a first bevelled gear ring which is fixed to a support which is anchored to the base member to be centred on one of the frame element stub axles with the portion of the frame element which carries the stub axle being rotatable in the ring gear, a second smaller diameter bevelled gear ring which is meshed with the first and is releasably fixed to the second axis shaft portion on the outside of the frame element to be rotatable about the second axis of rotation of the frame element, and means for rotating the stub axle on which the first ring gear is centred to cause the frame element to be manipulated.

The mould supporting frame element shaft portion may pass axially through the second ring gear and could carry a manually operable lock for releasing the ring gear from the shaft portion and its teeth from the teeth of the first ring gear to enable the frame element to be rotated about its first axis of rotation independently of the first ring gear.

The first ring gear may be fixed to its support by formations which each space the ring gear from the support in the direction of the frame element and may include means for adjusting each spacer formation towards and away from its support to ensure optimum engagement of the ring gear teeth with those of the second ring gear.

The mould locating means could be a frame arrangement which is fixed to the frame element shaft, which carries the second ring gear, and in which the or each mould is releasably located by hand operated clamps which additionally lock opposed mould shells of the or each mould together during the moulding operation.

The stub axle rotating means may include a drive wheel on an extended portion of the stub axle.

The machine preferably includes a carousel base which is rotatable on a floor about a central axis and which carries three of the above mould manipulator arrangements with their base members fixed to the upper surface of the carousel base.

The base members of the mould manipulator arrangements may be circular and may be centred at 120° intervals on a circle on the carousel base which is concentric with its axis of rotation. The underside of the carousel base may carry a circular track which is fixed to it and is centred on the central axis of the base and the machine may include a set of suitably spaced wheel arrangements which are mounted on the floor and which are each adjustable in vertical height with its wheel engaged with the track on the underside of the carousel base, and means for index rotating the base on the wheel arrangements in 120° increments about the carousel axis between a heating station, a cooling station and a mould stripping and loading station.

The heating station may include a heating chamber housing which is shaped to enclose a mould manipulator arrangement on the carousel base, means for heating the chamber to a predetermined moulding temperature and a crane which is free of the carousel base with its crane rope adapted to lower the heating chamber onto the heating station position on the carousel base over a mould manipulator arrangement and to lift the chamber from the base to be clear of the mould manipulator arrangement on the completion of the hot moulding cycle of operation of the heating station.

The crane may include an overhead crane beam which is free of the carousel base and extends over the centres of the heating and cooling station positions on the carousel base and the cooling station could include an open-topped side wall arrangement for surrounding a manipulator arrangement on the carousel base, a rope which is connected to the crane beam for lowering and raising the wall arrangement simultaneously with the heating chamber housing onto and from the carousel base and fans in the wall arrangement for blowing cooling air onto the or each mould in the manipulator frame arrangement when the wall arrangement is on the carousel base.

Both the heating station heating chamber housing and the cooling station wall arrangement enclosure may carry motors on the outside of their walls for driving rubber treaded friction wheels, which when the enclosures are lowered by the crane over the mould manipulator arrangements at the station positions on the carousel base, come into pressure contact with the drive wheels of the manipulator arrangements, the stub axles of which pass through vertical slots in the enclosure walls, on the outside of the enclosures to cause the manipulator arrangements to manipulate the moulds in the enclosures.

The side wall arrangement may include jets for spraying misted cooling water into the space enclosed by the wall arrangement when on the carousel base.

In a second form of the invention the machine may include two heating stations, two cooling stations and a single mould stripping and loading station, two crane beams which are free of the carousel base with a first of the crane beams located over the centres of the two heating station positions on the carousel base for lowering and raising the heating chamber housings with the second located over the centres of the cooling station positions on the carousel base for lowering and raising the wall arrangements with ropes on the crane beams being adapted to simultaneously lower and raise the housings and wall arrangements onto and from the carousel base.

BRIEF DESCRIPTION OF THE DRAWINGS

An embodiment of the rotational moulding machine of the invention is now described by way of a non-limiting example only with reference to the drawings in which.

DETAILED DESCRIPTION OF THE PREFERRED EMBODIMENT

Figure 1:
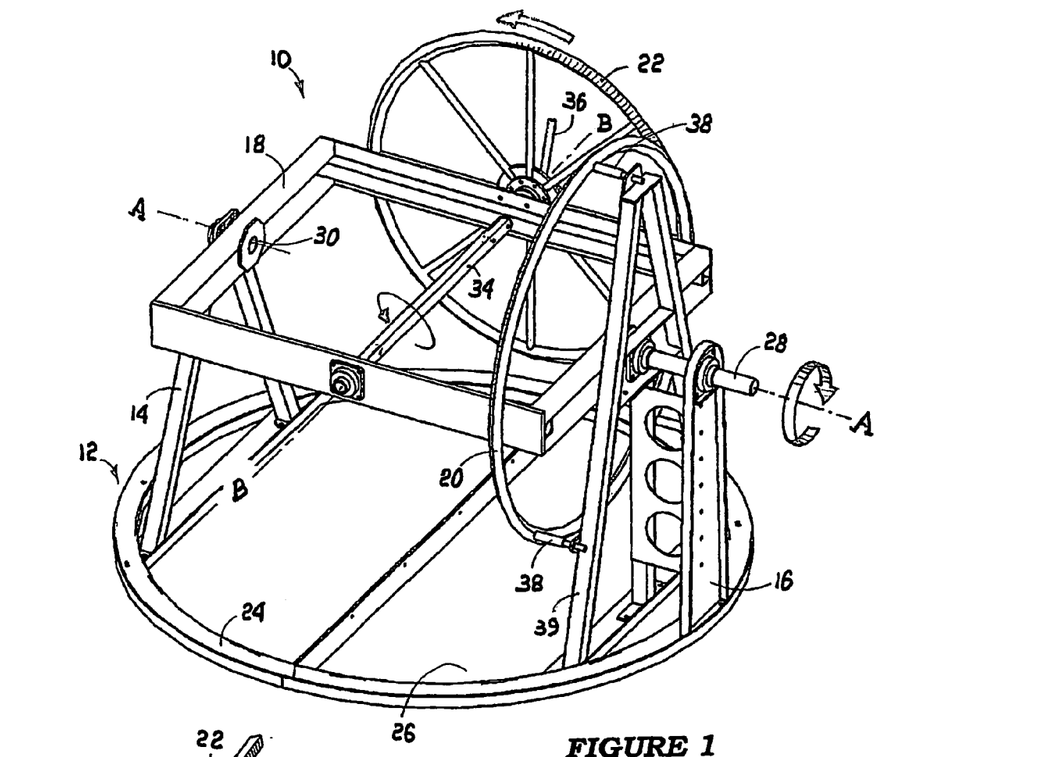
FIG. 1 is an isometric view of the mould manipulator arrangement of the machine.

FIG. 1 illustrates the mould manipulation arrangement of the invention which is shown in the drawings to include a circular base member 12, two upright supports 14 and 16 which are fixed to the base, a frame element 18 and two bevel-toothed ring gears 20 and 22.

The base member 12 includes a circular upwardly facing peripheral channel 24 which is located on a sheet metal base 26 which, in practice, carries suitable heat insulating material.

The frame supports 14 and 16 are shaped as shown in FIG. 1 and are bolted to structural members in the base member 12, as shown in FIG. 1.

The rectangular frame element 18 is located on the supports on stub axles 28 and 30 which are fixed at one end to the centres of two opposed frame members, as shown in the drawing, and are journaled for rotation on a common axis A in bearings which are carried by the supports. The stub axle 28 carries on its free end a drive wheel 32 which is shown only in FIGS. 2 and 3.

Figure 2:
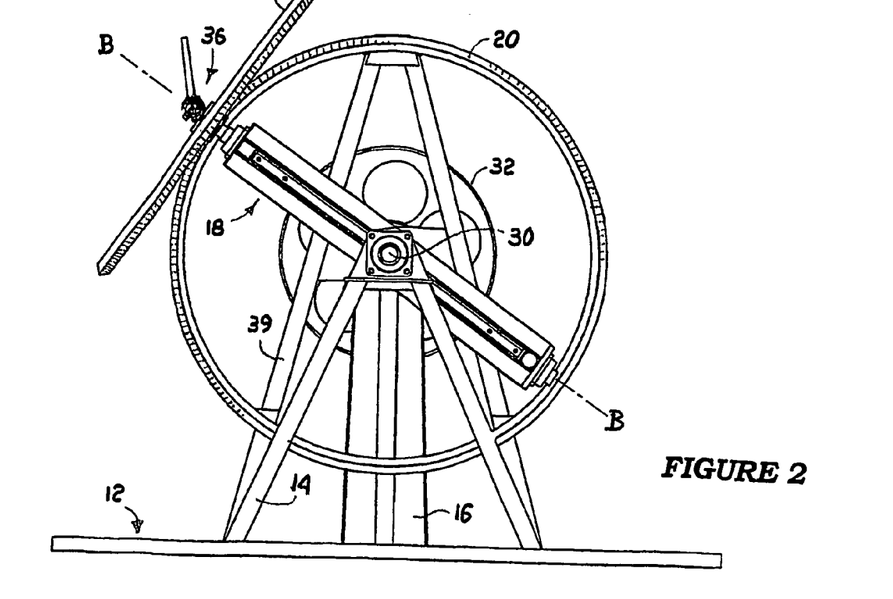
FIG. 2 is a rear elevation of the mould manipulator arrangement of FIG. 1.

The ring gear 22, which as seen in FIGS. 1 and 2, has a smaller diameter than that of the ring gear 20 and is fixed to a shaft 34 which is journaled for rotation in bearings which are mounted on the remaining opposite members of the frame element 18. The shaft 34 passes centrally through the frame members which carry it for rotation on a second axis B which is normal to and intersects the axis A at the centre of the frame element 18. The shaft is, between the frame members in this embodiment of the invention, square in cross-section. The ring gear 22 is spoked and its hub is locked to the shaft 34 by a dog clutch which is engaged and released from the shaft by a hand operated clamp 36, as shown in FIG. 2, to enable the ring gear 22 to be moved outwardly and away from the ring gear 20 to break their tooth mesh to enable the frame element to be rotated about the axis A free of the ring gear 20 for a reason which is explained below. To re-engage the gear 22 with the gear 20 the clamp 36 is operated to move the ring gear 22 back towards the frame element 18 to bring its teeth back into mesh with those of the ring gear 20.

The gear 20 is a plain unspoked ring gear and carries three rearwardly facing spacer posts 38 which are fixed to it and which are adjustably attached to an upright A-frame 39 which is attached to the base member 12, as shown in FIG. 1. The purpose of the adjustable posts is to enable the planar position of the ring gear 20 to be adjusted to optimise the mesh of its teeth with those of the ring gear 22. The end of the frame element 18 which carries the stub axle 28 is rotatable in the ring gear 20, as shown in FIGS. 1 and 3.

The teeth on the ring gear 22 are uneven in number so that they are not integer multiple s of those on the gear 20 to desynchronise the rotation of the gear with respect to the rotation of the frame element 18 about its axis A-A.

Figure 3:
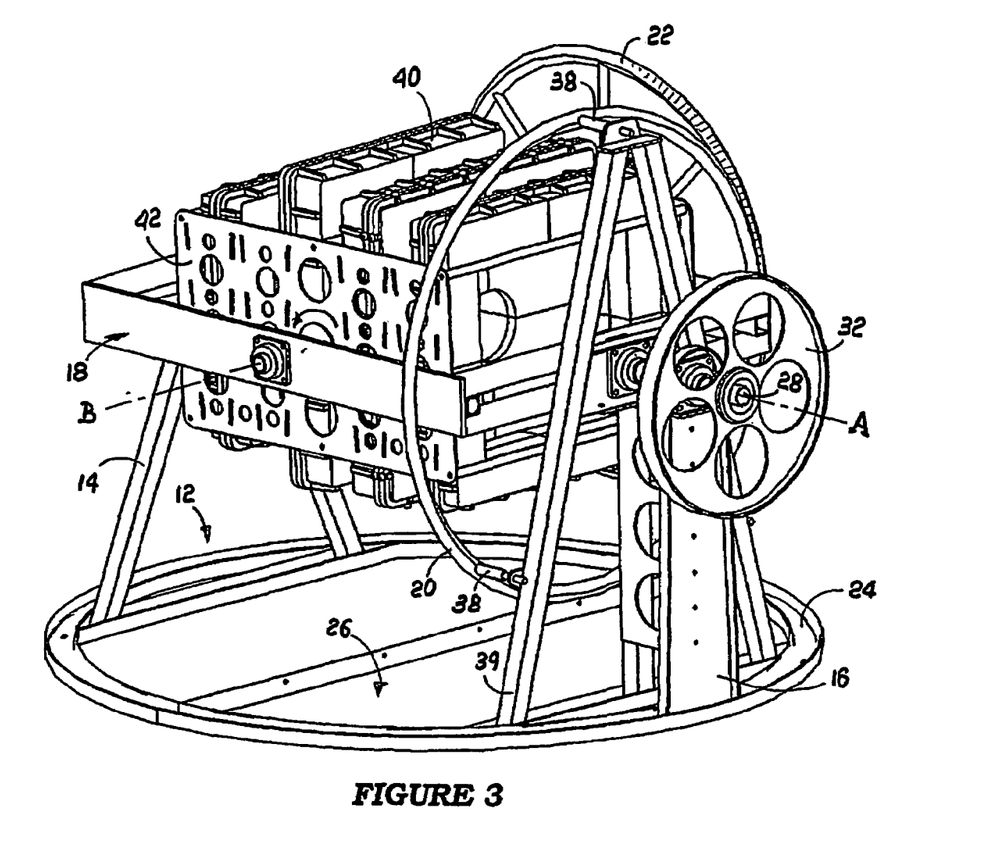
FIG. 3 is an isometric view of the manipulator arrangement of FIGS. 1 and 2 shown including a set of moulds.

Although any rotational moulding moulds may be used with the manipulator arrangement 10 of the invention, in this embodiment of the invention, the moulds are used for moulding reasonably flat items such as forklift pallet bases and are flat box-shaped moulds 40 which are split on their side walls and are releasably located in a mould housing 42 which is secured to for rotation with the bevelled gear 22 shaft 34 in the frame element 18 as shown in FIG. 3. The shaft 34 could, however, in another embodiment, be replaced by two shaft portions which are journaled in the frame element 18 in the shaft 34 positions with one of the shaft portions carrying the ring gear 22 and both carrying, on the inside of the frame element 18 a flange or some other formation for connection to the mould housing or the like mould engaging apparatus.

In use of the mould manipulator arrangement 10, the drive wheel is rotated, as is explained below, to cause the sub axle 28 to rotate the frame element 18 about its first axis A-A and in so doing carries with it the smaller diameter ring gear 22 which is caused by its tooth engagement with the ring gear 20 teeth to orbit around the stationary ring gear 20 as illustrated in FIG. 2. The uneven difference in the number of teeth on the two dissimilarly sized gears ensures that the pattern of rotation of the mould housing 42 relatively to the rotation of the frame element 18 is not repetitive.

What is important to note is that the torque arm which rotates the frame element 18 about its axis A-A is much longer, than that of the prior art manipulators, in extending from the axis A-A to the hub of the ring gear 22 and so significantly reduces the torque load between the ring gears 20 and 22 relatively to the loads experienced in the prior art machines. This feature of the manipulator of the invention together with the fact that the stub axles 28 and 30 at opposite ends of the frame element 18 are fully supported by the supports 14 and 16 when the frame element is fully loaded with moulds 40 significantly minimises the cyclic stress reversals which fatigue and damage the manipulator components of the prior art machines.

Figure 4:
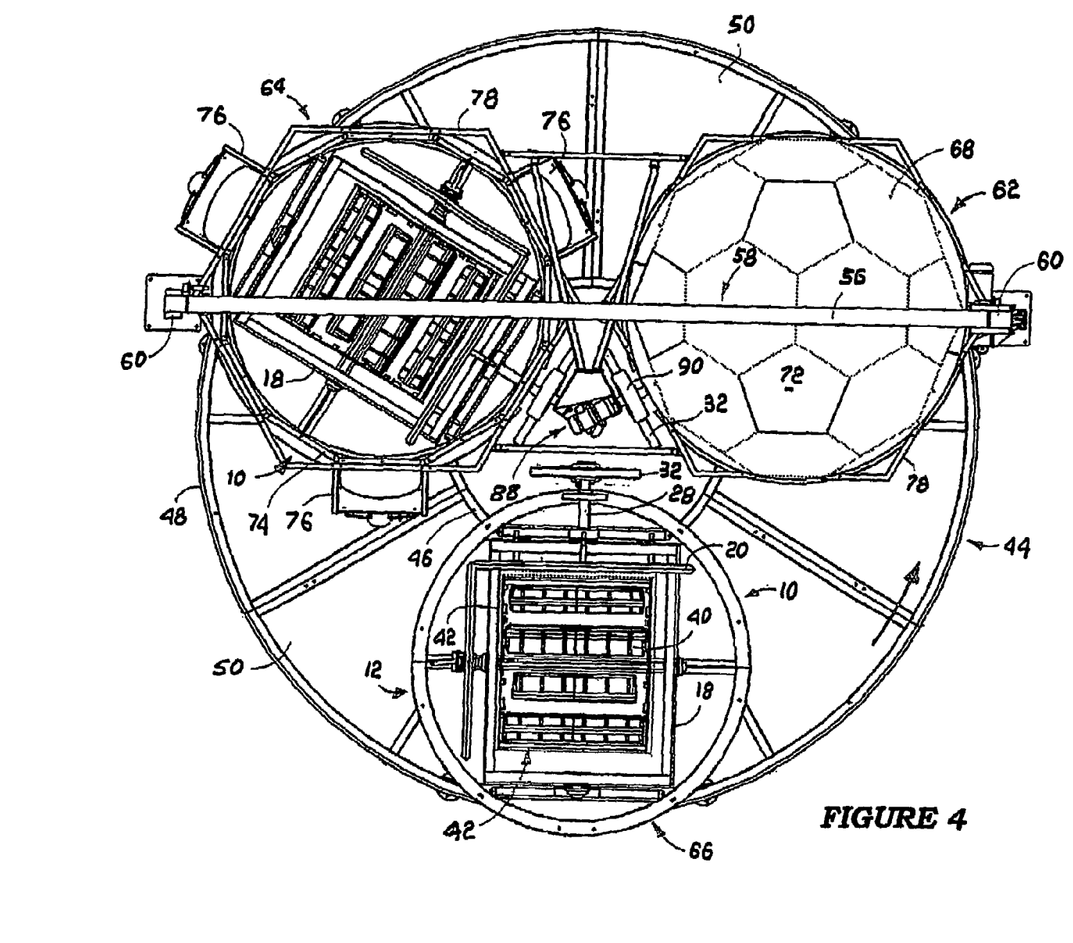
FIG. 4 is a plan view of the complete rotational moulding machine of the invention.
Figures 5, 6:
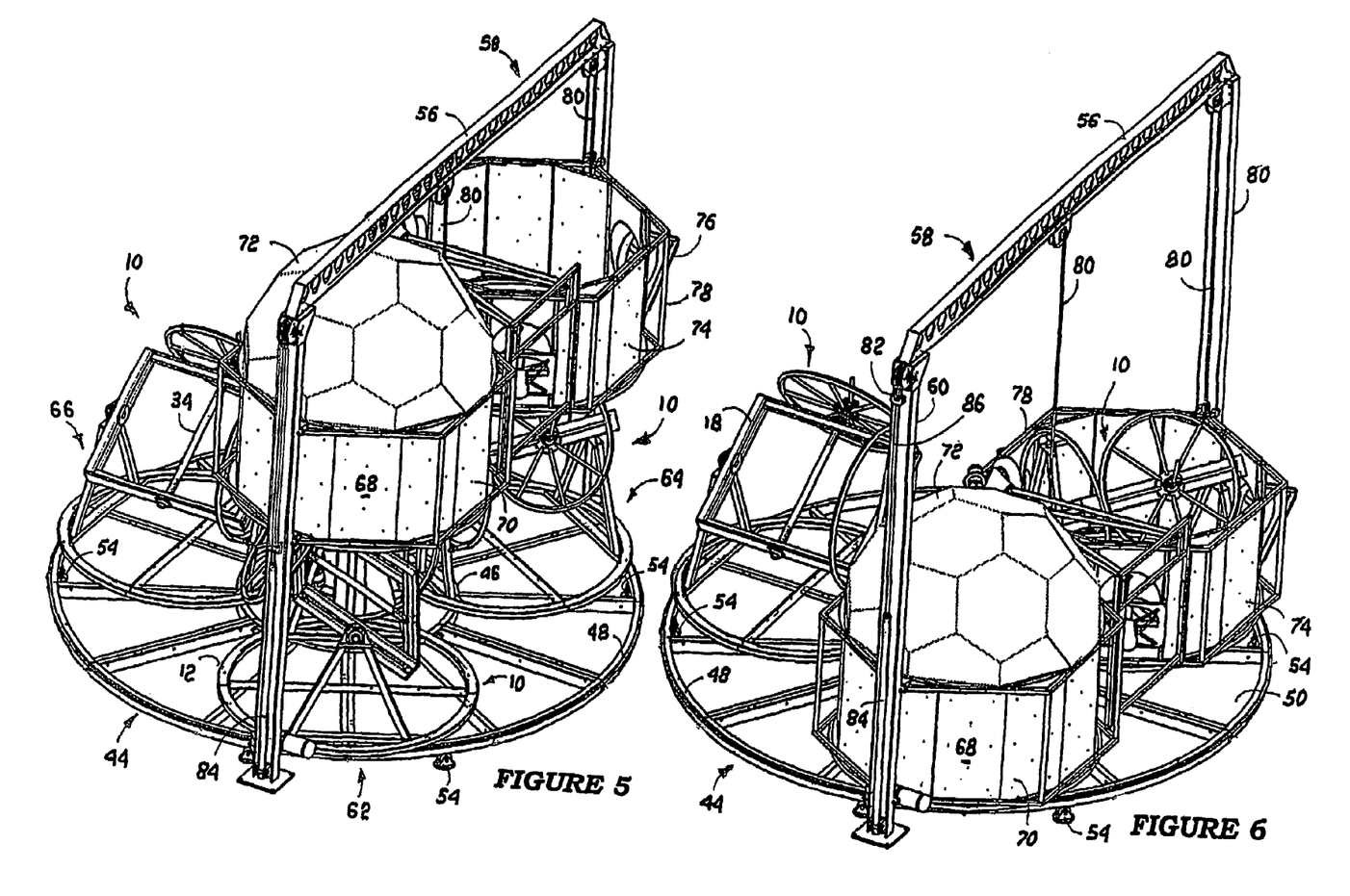
FIG. 5 is an isometric view of the machine of FIG. 6 shown in one position of operation of the machine.
FIG. 6 is the same view of the FIG. 5 machine in a second position of operation of the machine.

As is shown in FIGS. 4 to 6 of the drawings the moulding machine of the invention additionally includes a circular carousel base 44 which is composed of two concentric base rings 46 and 48 which are bridged by segmented floor sections 50. The upper surface of the annular carousel floor is covered with expanded metal flooring, which is not shown in the drawings.

The underside of the base ring 48 carries a wheel track which is L-shaped in cross-section with one flange of the track fixed to the underside of the ring 48 while the other is downwardly directed inwardly from the vertical face of the ring 48. The radially inner base ring 46 carries a similar wheel track.

Both the inner and outer wheel tracks are located on floor mounted wheel assemblies 54, only some of which are shown in FIGS. 5 and 6. The wheels of the wheel assemblies are vertically adjustable for the levelling of the carousel which is freely rotatable about its axis on the carousel wheel tracks with the downwardly depending track flanges holding the carousel in a fixed axial position on the floor which carries it. Although not shown in the drawing, the base ring 46 additionally includes an inwardly directed wheel track flange which is engaged with floor mounted hold-down wheels which are engaged with its upper surface to prevent vertical movement of the carousel.

Three of the FIGS. 1 to 3 mould manipulator arrangements 10 are located on the carousel with their circular bases fixed to structure on the upper surface of the carousel, as shown in FIGS. 4 to 6. The manipulators are located on the carousel base 44 with their axes A of rotation being displaced from each other on the base on 120° radials with their axes A obviously intersecting at the centre of the carousel base as will be apparent from FIG. 4.

The cross-beam 56 of an overhead crane 58 is located over the carousel base 44 on two floor mounted posts 60 with the beam 56 being aligned with the centres of two of the mould manipulator bases 12 when the manipulators are directly below the beam 56, as shown in FIG. 4. The positions of the manipulators 10 in FIG. 4 are shown at station positions of the machine which are fixed relatively to the crane 58 and the floor on which the carousel is mounted, electronically by a control system of the carousel which sequentially stops the indexed rotation of the carousel with the manipulators 10 in their station positions. The stations beneath the crane beam 56 are a heating station 62 and a cooling station 64. The remaining station 66 is a mould stripping and loading station. The carousel base 44 could be index rotated between the three stations by any suitable drive arrangement but in this embodiment of the invention is chain driven by a chain which surrounds the base ring 48 and is engaged with its sprocket teeth 52 and a sprocket of a drive motor which is mounted on one of the posts 60.

A floor mounted inverted L-shaped bracket, not shown, is located at the stripping station 66 position adjacent the carousel base ring 48 with an inwardly directed flange which is spaced from the floor facing the base ring 48. The carousel base ring includes a roller which is rotatable on an axle which is fixed to and projects radially outwardly from the ring 48 on each of the radial lines on which the manipulator arrangements 10 are located. The three rollers are, on indexed rotation of the carousel, each sequentially positioned under the bracket flange at the stripping station 66 position to resist any vertical lifting of the carousel which might occur when moulds are being stripped from the mould manipulators 10.

At the heating station position below the crane beam 56 the heating station includes a heating chamber housing 68 which has vertical side wall panels 70, which are seen only in FIGS. 5 and 6, and a space saving domed roof 72 which is sealingly fixed to the side wall panels. The housing 68 is double walled with a suitable heat insulation between the skins of the wall. The undersides of the wall panels 70 are sealingly located in the base of a circular U-shaped channel which is fixed to the wall panels and which is engageable in the channel of a base member 12 of a mould manipulator arrangement 10.

The cooling station 64 includes a wall enclosure 74 which is constructed from panels in exactly the same manner as that of the heating chamber housing 68 but is open topped. Three fan housings 76 are attached to and open into the enclosure. The heating chamber housing, although not shown in the drawings, includes a gas burner which is similarly mounted in the side wall of the housing as are the fans 74 of the cooling station.

Both the heating chamber housing 68 and the cooling station enclosure 74 are located in a common frame arrangement which includes hexagonal frame structures 78 as shown in FIGS. 4 to 6.

The crane 58 simultaneously operates three stranded wire ropes 80, only two of which are seen in FIGS. 5 and 6, which are operated over pulleys adjacent the posts 60 and a central pulley. The ropes adjacent the posts are fixed to the outermost portions of the heating and cooling station hexagonal frames 78 and the central rope is connected to the interconnecting frame cross members which join the hexagonal frames beneath the centre of the crane beam 56 in FIG. 6. All three ropes are attached to a rope anchor 82 on the outside of the left hand crane post 60 in FIGS. 5 and 6. The rope anchor is attached to the free end of a hydraulic ram 84 piston rod 86 which, when retracted into its ram cylinder, as shown in FIG. 5, lifts the frame arrangement in which the heating chamber housing and cooling chamber enclosure are located to the position illustrated in FIG. 5 and which when on extension lowers the frame and so the heating chamber and cooling enclosure to the position shown in FIG. 6. In this position the heating chamber housing 68 totally encloses the mould manipulator arrangement 10 located at that station and the cooling enclosure surrounds the manipulator 10 at the cooling station position. The shape and dimension of the domed heating chamber housing 68 is such that the inner walls of the housings surround the manipulator 10 located in it as closely as is practical to minimise the heating energy required to heat the chamber and the moulds in it to the required moulding temperature.

The frame arrangement in which the heating chamber and cooling enclosure are located carries two motors, both shown generally at 88 in FIG. 4, which are each activated to drive a rubber treaded drive wheel 90 which, when the heating and cooling stations are lowered to their FIG. 6 positions, come into pressure bearing contact with the drive wheels 32 of the manipulators in the heating and cooling stations to friction drive the drive wheels, as shown only in FIG. 4, and so the manipulators at the heating and cooling stations.

The wall panel 70 of the heating chamber housing 68 which is vertically located above the drive wheel stub axle 28 of the manipulator at the heating station, in the raised position of the heating chamber housing, is vertically slotted with the slot, not shown, having a rounded upper end so that the slot will sealingly engage with the entire flat flanged outer surface of the manipulator frame support 16, of FIG. 1, when the housing is lowered onto the carousel 44. Although not shown in the drawings, the slotted wall panel carries a gravity-biased slide which, when the chamber 68 and wall enclosure 74 are lowered, comes into contact with the upper surface of the frame 18 support 16 and is moved by the support upwardly on suitable guide rails in the heating chamber to clear the slot for the frame support 16 and which when the housing and wall enclosure are again lifted by the crane 58, to be clear of the manipulator arrangements 10, is gravity biased to close the slot to prevent heat escape from the housing other than the small heat loss from the open base of the raised housing.

In use of the moulding machine of the invention, assuming that the frame arrangement carrying the heating chamber housing 68 and the cooling station wall enclosure 74 is lifted to the position shown in FIG. 5 and the mould housings 42 of each of the mould manipulator arrangements 10 at the stripping and loading station 66 and the heating station 62 have been loaded with moulds which have been power charged, the first cycle of operation of the machine is commenced by the crane 58 lowering the frame assembly which carries the heating chamber housing 68 and the cooling station wall enclosure 74 onto the carousel base at which the circular frame elements on the undersides of the heating chamber housing and wall enclosure are engaged in the circular channels 24 of the manipulator arrangement base members 12. As mentioned above, as the heating chamber and cooling station wall enclosure 74 are lowered onto the carousel base the driven wheels 90 come into contact with the drive wheels 32 of the manipulators at the station to commence the two axis manipulation of the moulds described with reference to FIGS. 1 to 3. The heating chamber housing 68 gas burner is now activated to heat the heating chamber to a predetermined moulding temperature and the moulding of the powered plastic material in the moulds is carried out over a predetermined time cycle. At the end of the heating cycle the heating chamber gas burner is shut down to very low heat emission and the crane 56 is instructed to lift the frame arrangement upwardly until the heating chamber and wall assembly are clear of the manipulators. The carousel is now indexed, in the direction of the arrow in FIG. 4, to rotate the manipulator 10 carrying the heated moulds to the cooling station position in the assembly and the manipulator carrying the loaded moulds from the loading station 66 to the heating station 62. With the heating station now in its raised position the slot in the heating chamber housing wall for the frame support 16 has again been sealingly closed above its base as described above and very little heat escapes from the sealed heating chamber from its open underside in the short period of time that it remains in its raised position. The little heat that does escape is made up by the low heat emission from the gas burner. With the manipulators now in their fresh positions in the assembly the frame assembly is again lowered by the crane and the heating cycle of the heating chamber is again commenced and, as a result of the heat conserved in the heating chamber while raised from the carousel, the effective moulding cycle is rapidly initiated. In the meantime, the fans in the cooling station enclosure are left inactive for a short period to enable the heated plastic in the moulds which are carried by the manipulator to sinter i.e. become chemically degassed, and after the short predetermined period the fans are activated to commence cooling of the moulds. Because of this small delay in the commencement of the cooling of the moulds the cooling station wall enclosure could carry water mist sprays which are directed into the fan air streams to decrease the necessary cooling period of the moulds by evaporative cooling. At the end of the heating cycle the frame arrangement is again raised, as described above, and the carousel is index rotated by its chain drive to bring the manipulator 10 with its freshly heated moulds to the cooling station and the now cooled moulds from the cooling station to the mould stripping station. At the stripping station an operator now releases the ring gear 22 from the ring gear 20 of the manipulator at that station by means of the dog clutch 36 handle to enable him to manually rotate the frame element 18 to the horizontal position shown in FIG. 3 at which it is locked to one of the other frame elements of the manipulator by means of a manually operable pin, not shown. The mould clamps are now released to enable the moulds 40 to be removed from the mould housing 42 and freshly charged moulds are rapidly dropped into their place in the housing and locked in position by means of the clamps to make the manipulator ready for its indexed move to the heating station prior to the end of the heating cycle in progress. From here on the cycle described above is repeated with moulds containing moulded components being removed from the machine at each indexed step of rotation of the carousel base 44.

The building in which the moulding machine of the invention is housed is preferably equipped with a hot air flume which extends from above the crane 58 over the cooling station 64 position beneath it to the outside of the building. The flume preferably includes a fan for drawing hot air from the cooling station into and expelling it from the flume. A suitable heat exchanger could be located in the flume between its mouth over the crane and the fan in it with heated air from the heat exchanger being fed into the air inlet to the burner on the heating chamber housing 68 further to optimise the use of heating gas.

Figure 7:
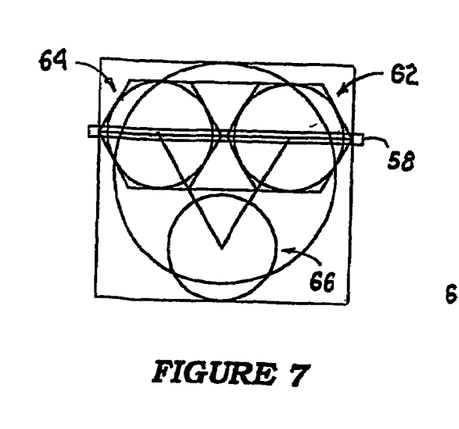
FIG. 7 is a schematic diagram of the moulding machine of FIGS. 4, 5 and 6.
Figure 8:
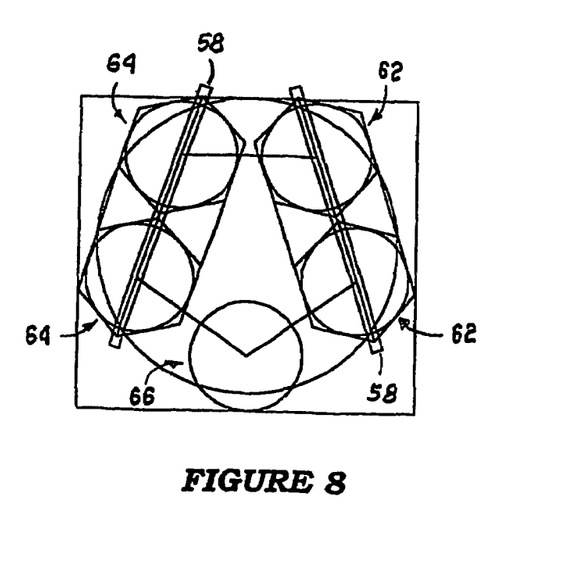
FIG. 8 is a schematic diagram of a second embodiment of the machine of the invention.

The machine described is illustrated schematically in plan in FIG. 7 with FIG. 8 comparatively illustrating a five-stage operation of an enlarged FIG. 7 machine. In this machine two heating stations 62 are shown on the right of the drawing and two cooling stations 64 on the left. The pairs of heating and cooling stations are each raised and lowered by their own overhead crane 58 with the two cranes being coupled by frame structure so that the heating chamber housings 68 and the wall enclosure 74 of the cooling stations are all raised and lowered simultaneously. The advantage to this larger machine over that of the FIG. 7 machine is that each manipulator in its circuit to and from the stripping station 66 is heated and cooled in two indexed movements of the carousel with the cycle time of each manipulator through the heating stages, which determined the entire cycling time of the machine, being halved so doubling the machine output with the very little extra floor space size required to house the FIG. 8 machine over that of FIG. 7 being seen from the outline squares in the two drawings which are drawn very nearly to scale.

The invention claimed is:

1. A rotational moulding machine comprising
a carousel base which is horizontally rotatable on a floor about a central vertical axis,
at least three mould manipulators which are mounted on the carousel base to be centred at equal intervals on a circle which is concentric with the axis of rotation of the carousel base,
a vertically movable heating station housing, having an open underside, for enclosing a mould manipulator on the carousel base and means in the housing for heating the mould manipulator and the or each mould which it carries,
a vertically movable cooling station enclosure which includes at least a side wall for surrounding a mould manipulator on the carousel base and means on the enclosure wall for cooling the mould manipulator and the or each heated mould which it carries,
and means, independent from the carousel base, for simultaneously raising the heating station housing and the cooling station enclosure from the carousel base, and the mould manipulators which they enclose, in use, to an elevated position in which they are clear of the mould manipulators to enable the mould manipulators to be moved by indexed rotation of the carousel base from the heating and cooling stations and then simultaneously lowering the heating station housing and the cooling station enclosure over manipulators on the carousel base which have replaced them.

2. A rotational moulding machine as claimed in claim 1 wherein the underside of the carousel base includes a circular track which is fixed to it to be centred on its axis of rotation and the machine includes a set of wheel arrangements which are mounted at suitably spaced intervals on the floor in a circle beneath the carousel base with their wheels engaged with the carousel base track and means for index rotating the carousel base and the mould manipulators which it carries between static mould heating, cooling and mould loading and stripping station positions over the carousel base.

3. A rotational moulding machine as claimed in claim 1 wherein the heating station housing includes a wall portion for surrounding a mould manipulator on the carousel base and a roof portion with the two housing portions defining between them a heating chamber which, when the housing is lowered onto the carousel base, totally encloses the mould manipulator.

4. A rotational moulding machine as claimed in claim 3 wherein the heating station housing roof portion is domed to minimise heating space in the chamber.

5. A rotational moulding machine as claimed in claim 4 wherein the heating means in the heating station housing is at least one gas burner which is fixed to the housing wall.

6. A rotational moulding machine as claimed in claim 1 wherein the cooling station enclosure cooling means is at least one air cooling fan.

7. A rotational moulding machine as claimed in claim 6 wherein the cooling station cooling means includes at least one water cooling water spray nozzle.

8. A rotational moulding machine as claimed in claims 1 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

9. A rotational moulding machine as claimed in claim 8 wherein the frame arrangement of each of the mould manipulators is mounted on a sheet metal base member which is fixed to the upper surface of the carousel base and includes on its upper surface a suitable heat insulating material and a circular upwardly open peripheral channel in which the bottom of at least the sidewall of the heating station housing is sealingly located when the housing has been lowered onto the carousel base over a mould manipulator.

10. A rotational moulding machine as claimed in claim 8 wherein the diameter of the second gear ring is smaller than the first and the teeth on the two gears are uneven in number so that they are not integer-multiples of one another.

11. A rotational moulding machine as claimed in claim 8 wherein a drive wheel is fixed to one of the frame element stub axles on the outside of the frame element of each of the mould manipulators for rotating the frame element about its axis A.

12. A rotational moulding machine as claimed in claim 1 wherein the carousel base carries three mould manipulators and the heating station housing and the cooling station enclosure are coupled together by a frame structure to which the raising and lowering means is connected.

13. A rotational moulding machine as claimed in claim 1 wherein the carousel base carries at least five mould manipulators and the machine includes a pair of heating station housings, a pair of cooling station enclosures and at least one mould loading and stripping station with each pair of housings and enclosures being positioned over the carousel base to enclose adjacent mould manipulators on the carousel base when lowered onto the base with the housing and enclosure pairs each being coupled together by a frame structure with the raising and lowering means being adapted to simultaneously raise and lower both frame structures from and onto the carousel base.

14. A rotational moulding machine as claimed in claim 11 wherein the frame arrangements of the mould manipulators are so fixed to the carousel base that their frame element axes A intersect each other on the axis of rotation of the carousel base with the mould manipulator frame element stub axles which carry the drive wheels being radially innermost on the axes A of the frame elements.

15. A rotational moulding machine as claimed in claim 14 wherein the or each heating station housing and cooling station enclosure carries a vertical slot in its side wall which is open to the underside of the wall for the passage in it of a mould manipulator drive wheel stub axle so that the drive wheel is situated on the outside of the or each heating station housing and cooling station enclosure when the or each housing and enclosure is lowered onto the carousel base.

16. A rotational moulding machine as claimed in claim 15 wherein each frame structure which couples a pair of mould manipulator enclosures carries two mould manipulator drive arrangements which are so located in the frame structure that each will engage a drive wheel of a mould manipulator to drive the manipulator only when the enclosure is lowered onto the carousel base over the manipulator and to disengage from the drive wheel when the frame structure which carries them is raised from the carousel base.

17. A rotational moulding machine as claimed in claim 13 wherein the raising and lowering means for the or each frame structure is a fixed overhead crane beam which is located over the centres of the mould manipulator enclosures which are carried by the frame structure and ropes which depend from the beam and are attached to the frame structure for raising it from and lowering it onto the carousel base.

18. A rotational moulding machine as claimed in claims 2 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

19. A rotational moulding machine as claimed in claims 3 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

20. A rotational moulding machine as claimed in claims 4 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

21. A rotational moulding machine as claimed in claims 5 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

22. A rotational moulding machine as claimed in claims 6 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

23. A rotational moulding machine as claimed in claims 7 wherein each mould manipulator comprises a frame arrangement which is fixed to the upper surface of the carousel base and includes two spaced upwardly projecting supports, a rectangular frame element which carries stub axles which are attached centrally to and project outwardly from two opposite sides of the frame element with each stub axle being journaled for rotation in one of the frame supports for rotation of the frame element about an axis A, means for supporting at least one mould in the frame element including outwardly projecting shaft portions which are journaled for rotation in the remaining opposite sides of the frame element for rotation of the mould support about a second axis B, which is normal to the axis A, a first bevelled gear ring which is fixed to one of the frame element supports to be concentric with the frame element axis A, a second bevelled gear ring which is meshed with the first, and means releasably locking the second gear ring to a mould support shaft portion so that the gear rings may be uncoupled from and re-engaged with each other.

\* \* \* \* \*